United States Patent [19]

Sizemore

[11] 4,180,050

[45] Dec. 25, 1979

[54] OUTDOOR COOKING GRILL UNIT WITH TILTING FEATURE

[76] Inventor: Guy D. Sizemore, Pickaway, W. Va. 24964

[21] Appl. No.: 844,490

[22] Filed: Oct. 21, 1977

[51] Int. Cl.² .......................... A47J 37/07; F24B 3/00
[52] U.S. Cl. ............................. 126/25 A; 99/421 HV; 126/304 R; 248/185
[58] Field of Search ................. 126/25 R, 25 A, 25 B, 126/25 C, 9 R, 9 B, 304 R, 304 A, 305, 306, 242, 245; 99/421 R, 421 H, 421 HH, 421 HV; 110/167; 108/7, 24; 248/178, 185, 122, 130, 133; 403/92, 96; 298/2, 3, 5, 6, 10, 17 R

[56] References Cited

U.S. PATENT DOCUMENTS

| | | | |
|---|---|---|---|
| 1,286,087 | 11/1918 | Petus et al. | 248/185 X |
| 2,121,514 | 6/1938 | Waterman | 110/18 |
| 2,573,988 | 11/1951 | Saltzberg | 126/25 R X |
| 3,045,271 | 7/1962 | Cinotti | 403/96 X |
| 3,119,387 | 1/1964 | Beller | 126/25 A |
| 3,152,838 | 10/1964 | Morehead | 298/17 R |
| 3,298,361 | 1/1967 | Clark | 126/25 R |
| 3,583,385 | 6/1971 | Beller | 126/25 A |
| 4,090,490 | 5/1978 | Riley et al. | 126/25 R |

FOREIGN PATENT DOCUMENTS

1013358 12/1965 United Kingdom ................. 126/25 R

*Primary Examiner*—William F. O'Dea
*Assistant Examiner*—Harold Joyce
*Attorney, Agent, or Firm*—Mason, Fenwick & Lawrence

[57] ABSTRACT

An outdoor cooking grill for charcoal cooking and the like, including a generally rectangular fire box having a bottom wall normally disposed in a horizontal position and sidewalls provided with front and rear vertically extending slots for receiving front and rear leg portions of handles extending from opposite ends of a grating member to permit vertical adjustment of the position of the grating member. The front and rear slots have vertically spaced notches for receiving the handle legs and supporting the grating at different vertical positions, and the front slots open through the top edge of the end walls while the rear slots are closed at the top edge so that the grating may be swung about the rear handle legs to an inclined tilted position relative to the bottom wall of the fire box. The firebox is supported by a swivel coupling on a vertical pedestal which permits tilting movement of the firebox about a horizontal axis to a forwardly and downwardly inclined tilted position.

6 Claims, 6 Drawing Figures

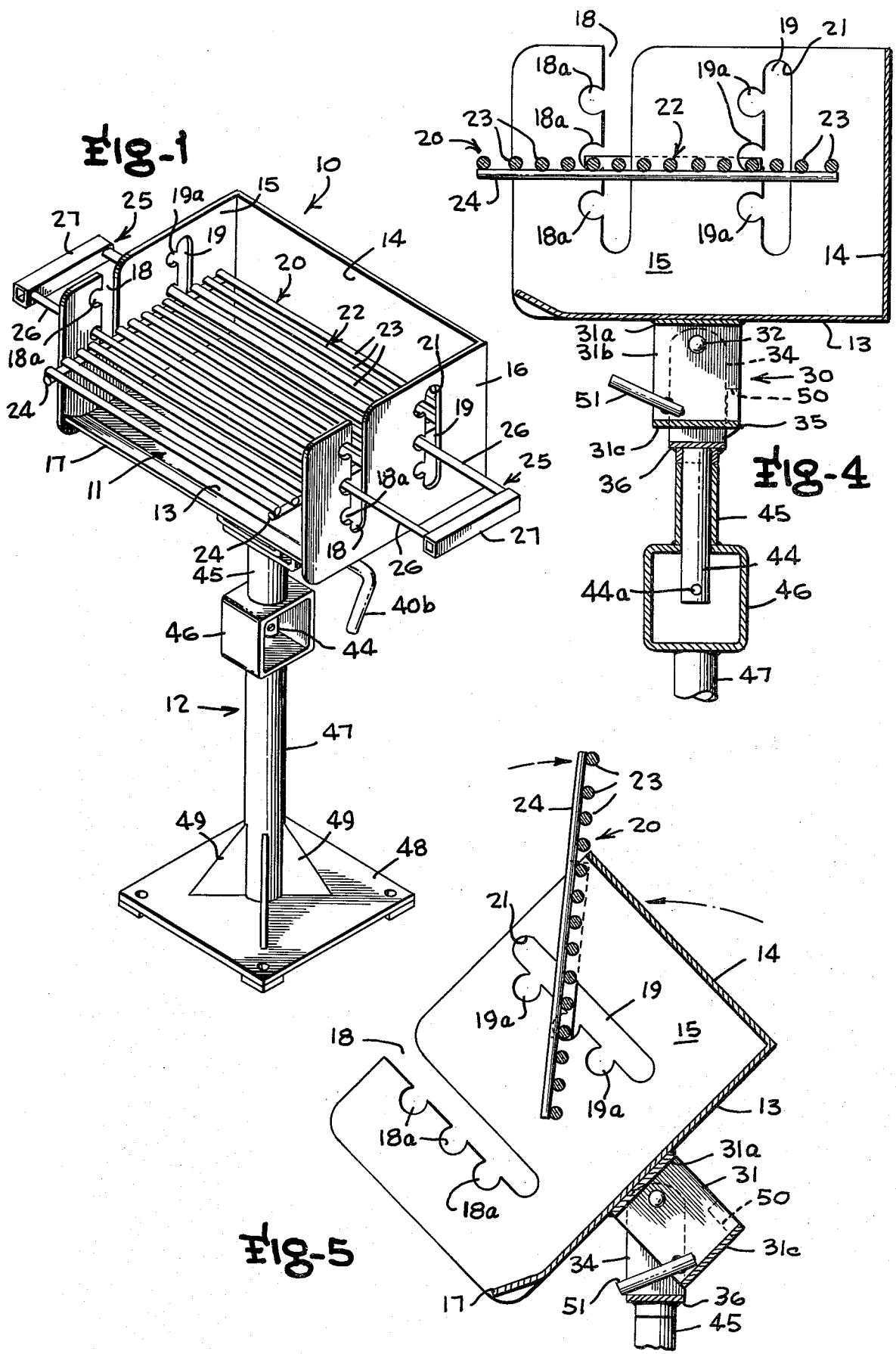

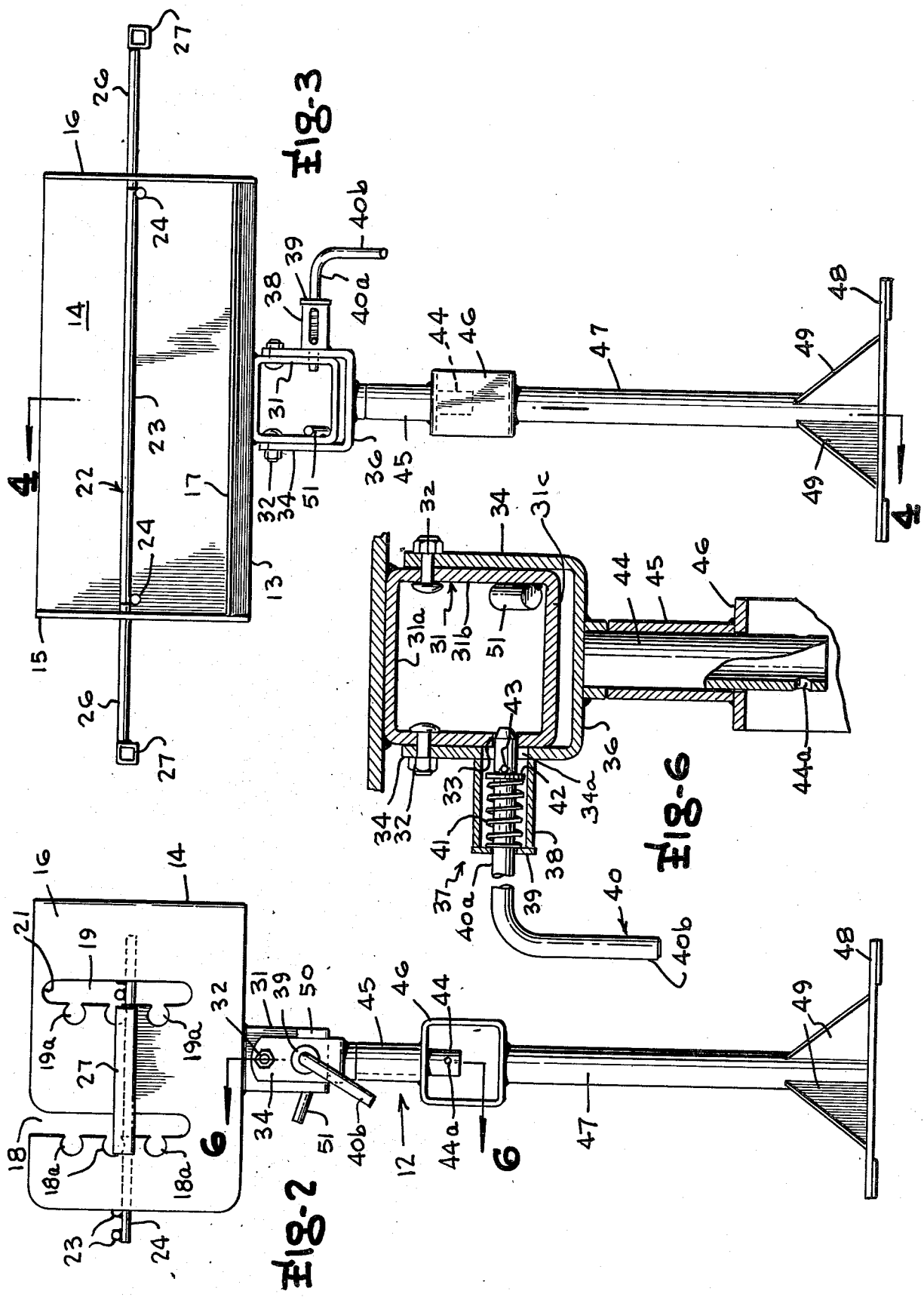

OUTDOOR COOKING GRILL UNIT WITH TILTING FEATURE

BACKGROUND AND OBJECTS OF THE INVENTION

The present invention relates in general to outdoor grills for outdoor cooking over charcoal fires or the like, and more particularly to outdoor cooking grills having an upwardly and forwardly opening fire box and a vertically adjustable grating member or food supporting rack supported by the fire box wall, wherein the fire box and grating are supported for swivel action about a vertical axis so that the unit can be turned in various directions relative to the wind and wherein the fire box portion is tiltable relative to the pedestal for dumping the ash residue and the like.

Heretofore, a number of different types of outdoor cooking grills for cooking over fires of charcoal or similar fuel have been available, wherein the portion of the outdoor cooking grill which contains the charcoal fire assumes many different shapes, of which rectangular fire boxes and upwardly opening brazier type bowls are typical. A grating formed of metal rods secured together in an open work pattern or matrix to form a grating type platform above the fire bed may be supported in a number of ways for vertical adjustment to support the food at various levels above the coals or fire. However, those outdoor cooking grills formed with a generally rectangular fire box have most frequently been supported on a stationary pedestal fixed in the ground wherein the fire box is fixed to the pedestal in a manner which prevents its movement about the vertical axis of the pedestal from a predetermined fixed position, by virtue of the connection made between the fire box portion and the pedestal, and in which the fire box is not capable of any movement about a horizontal axis for discharge of the ashes from the fire box. Furthermore, those prior outdoor cooking stoves of which I am aware having vertically adjustable grating members associated with rectangular fire boxes which have vertical slots with notch excursions for receiving outwardly projecting handle portions of the grating member to accommodate vertical adjustment of the grating have either been constructed with all the slots opening through the top edges of the fire box side walls so that the grating is thus completely removable from the fire box, thus encouraging vandalism in public park installations and the like, or all of the slots have been closed at the top by heavy bars which capture the grating member permanently in the fire box and prevent any removal or significant tilting movement of the grating.

It will be appreciated that ashes from the burned fuel, such as wood ashes or charcoal ashes, contain corrosive agents which eventually break down and contribute to rapid deterioration of the metal forming the fire box, so that if the bottom of the fire boxe is normally maintained in a horizontal position and is not completely freed of the ashes left from previous fires, rapid corrosive break down of the unit occurs. Furthermore, it is desirable to be able to rotate the fire box in various directions depending upon the direction of the wind, so that the open front of the fire box is directed downwind, and it is desirable to be able to rotate the grating member or grill top structure upwardly about a horizontal pivot axis while part of the grating member is still captured in the fire box to facilitate access to the fire chamber portion for cleaning purposes.

An object of the present invention, therefore, is the provision of a novel outdoor cooking stove for charcoal cooking and the like, having an upwardly and forwardly opening generally rectangular fire box of metal provided with vertically elongated slots with notch excursions for receiving outwardly extending integral handle portions of the grating member and supporting the grating at various elevations, wherein one of the slots at each side of the unit is closed at the top while the other slot at each side is open, permitting the grill to be swung upwardly through a substantial angle about a horizontal axis through one leg of the handle formations, and wherein the fire box is supported for swivel movement about a vertical axis through a supporting pedestal therefor and is supported for tilting movement through an approximately 45° angle allowing the bottom of the fire box to remain during nonuse at a tilted position so that rain and residue from burned materials can run freely from the bottom of the fire box when the unit is not in use.

Another object of the present invention is the provision of a novel outdoor cooking grill for charcoal cooking and the like, having a forwardly and upwardly opening generally rectangular fire box provided with a vertically adjustable grating member or grill top tiltable about a horizontal axis adjacent one leg of handles for the grating member, and wherein the fire box is capable of swiveling movement about a horizontal axis and tilting movement about a vertical axis to facilitate cleaning and disposition of the surfaces to allow drainage of water and minimize retention of corrosive residue during nonuse of the grill.

Other objects, advantages and capabilities of the present invention will become apparent from the following detailed description, taken in conjunction with accompanying drawings illustrating a preferred embodiment of the invention.

BRIEF DESCRIPTION OF THE FIGURES

FIG. 1 is a perspective view of an outdoor cooking grill constructed in accordance with the present invention;

FIG. 2 is a side elevation view of the cooking grill;

FIG. 3 is a front elevation view thereof;

FIG. 4 is a vertical section view taken along the line 4—4 of FIG. 3, with the grill disposed in horizontal normal use condition;

FIG. 5 is a vertical section view similar to FIG. 4, and taken along a similar section plane, but showing the fire box and grating member in tilted position; and FIG. 6 is a fragmentary section view taken along the line 6—6 of FIG. 2.

DETAILED DESCRIPTION OF A PREFERRED EMBODIMENT

Referring to the drawings, wherein like reference characters designate corresponding parts throughout the several figures, the outdoor cooking grill of the present invention, indicated generally by the reference character 10, comprises an upper fire box portion 11 normally supported in the horizontal position illustrated in FIGS. 1 and 2 on the pedestal, generally indicated by the reference character 12, formed as an upwardly and forwardly opening generally rectangular box having a horizontal bottom plate or wall 13, a rear vertical plate or wall 14, and a pair of side plates or walls 15, 16 welded together to form a unitary fire box structure. For example, the fire box may be fabricated from one quarter inch hot rolled steel plate to form a box measuring approximately 10 inches by 21 inches by 14 inches. The forward or front edge of the bottom plate 13 is provided with a lip 17 bent upwardly at approximately a 45° angle and having a two inch width, to retard fire from falling out of the box.

Each of the side walls 15, 16 are provided with two flame cut front slots 18 and rear slots 19 in the side plates 15, 16, each having a vertically spaced series of three notches or substantially circular extensions 18a, 19a communicating through the front edges of the slots 18, 19, to establish three vertically spaced horizontal grating or grill top positions for the grating or grill top 20. The front slots 18 extend all the way to and open through the top edge of the side plates 15, 16, while the rear slots 19 are not completely cut to the top edge of the side walls but terminate short of the top edge of the side walls, as indicated at 21, permitting the grating or grill top 20 to be raised backward and upward to the position illustrated in FIG. 5 tilting about a horizontal axis through the rear legs of the handle portions as later described, for ease in introducing larger pieces of wood into the fire box for wood fires, and to assist in cleaning the grill, while preventing complete removal of the grating or grill top to prevent theft and vandalism.

The grating or grill top 20 which fits into the slots 18, 19 has a generally rectangular grating section 22 fabricated, for example, from one half inch round rod stock providing a gridwork array of elongated rods 23, for example about 19 inches long for the dimensions of the fire box previously described, arranged along parallel axes extending transversely of the fire box and placed about one and a half inches on centers, welded at their ends to crosswise end rods 24 of similar stock. Outwardly extending substantially U-shaped handles 25 are formed by having two of the longitudinal rods 23 extending beyond the crosswise end rods 24 as shown, for example for a distance of about six and a half inches, providing handle legs 26, to the ends of which a crosswise handle member 27, formed for example from one inch hollow square tubing is welded to complete the U-shaped configuration of each handle. The square tubing forming the crosswise handle members 27 is hollow to allow air to flow through and cool the handle member, so that the user can comfortably grasp the handle without getting burned. In the fabrication of the grating member of grill top 20, the two longer longitudinal rods 23 forming the handle legs 26 are not welded to the crosswise end rods 24 at the same time the remaining rods 23 are welded to the end rods, or at least one of the longer longitudinal rods forming one set of handle legs 26 is not welded at this time, until the grating member or grill top 20 is to be installed in the slots 18, 19, the longitudinal rod 23 designed to extend through the slot 19 being extended through the slot and then welded at the appropriate location to the end rods 24 and the handle members 27 then being welded to the handle legs to complete the assembly and permanently retain the grating in assembled relation with the fire box.

A tilting or dumping and swivel coupling, generally indicated at 30 is provided at the bottom of the fire box for mounting the fire box on the top of the pedestal generally indicated at 12 to permit dumping of the fire box to an approximately 45° angle about a horizontal axis to the position illustrated in FIG. 5, and to permit swiveling of the fire box about a vertical axis through the center of the pedestal 12. This coupling or mounting assembly 30, in the illustrated embodiment, is formed of a piece of square tubing 31 which may, for example, be a three inch wide piece of one quarter inch by four inch by four inch square tubing welded along one side wall 31a, which becomes the top side of the tubing member 31, to the bottom wall 13 of the fire box. The coupling member formed by the tubing 31 is provided with a horizontally aligned pair of upper holes in the lateral side walls 31b of the tube member at an upper position to receive pivot forming bolts 32 therethrough, and one of the lateral side walls 31b is provided with a lower hole, for example about one half inch in diameter, indicated at 33 to receive a latch rod member as later described. The tubing member 31, which forms the upper coupling member of the coupling assembly 30 extends in nested relation between the upwardly extending sides 34 of upwardly opening channel member 35 which laterally flank the lateral sides 31b of the tubing member 31. The channel sides 34 of the channel member 35 have holes aligned with the holes in the tubing member sides 31b to receive the pivot forming bolts 32 therethrough and pivotally intercouple these two members for relative angular movement about the axis of the bolts 32. The channel member 35 is dimensioned so that the bottom or base wall 36 of the channel member is spaced about one half inch below the bottom side 31c of the tubing member 31 to leave a one half inch gap which allows for the 45° tilt of the fire box. A spring biased, manually releasable latch mechanism, indicated generally at 37 is mounted on one of the sides 34 of the channel member 35, and, in the illustrated embodiment, it is formed of a short hollow pipe section 38, for example formed of one inch diameter pipe, welded at one end to the adjacent side 34 of the channel member 35 in alignment with a one inch diameter hole 34a in the channel side 34. The outer end of the pipe section 38 is capped with an annular member, for example a washer 39 having a one half inch diameter hole, through which a longer leg 40a of an L-shaped latch rod 40 extends. The portion of the latch rod leg 40a extending into the pipe section 38 is surrounded by a coil spring 41 which is held in compression between the washer or annular wall 39 and a stop washer 42 fastened on the latch rod leg 40a by means such as a cotter pin 43. The pipe section 38 preferably has a slot extending parallel to its axis spanning a distance equal to or slightly greater than the range of movement desired for the latch rod, through which the legs of the cotter pin extend, with the ends of the cotter pin folded over the outside edges. The leg 40b of the latch rod 40a extending at right angles to the latter forms the handle for the latch rod, permitting the latch rod to be manually pulled outwardly from the coupling assembly 30 to withdraw its inner end from the hole 33, to allow tilting movement of the fire box between the horizontal FIG. 1 position wherein the end of the latch rod interfits in the hole 33 and the dumping or tilted position of FIG. 5. The base wall or bottom 36 is welded to a depending pipe section 44, which may be a six inch long section of one inch pipe providing the pivot pipe of a swivel joint for rotation of the fire box about a horizontal axis. The depending pipe section 44 extends through and is rotatably journaled in an outer vertical pipe section 45 welded to the top wall of a square tubing member 46, which may be a four inch by four inch by three inch piece of one quarter inch wall thickness tubing, which is in turn welded to the vertical pedestal pipe member 47 welded at its bottom to a steel base plate 48 and having brace or gusset plates 49 welded to the lower portion of the pedestal pipe 47 and base plate 48 for reinforcing purposes. The hole 44a extends transversely through the lower portion of the inner swivel forming pipe section 44 in the portion lying within the hollow bore of the tubing member 46 to permit a lock to be placed to prevent unwanted removal of the grill from the pedestal.

It will be appreciated that the fire box 11 will normally be retained in the horizontal position shown in FIG. 1 during use, wherein the tapered inner end of the latch rod 40 extends into the hole 33 in the tubing member 31 and is biased by the spring 41 to retain this latched condition. In this position, a stop plate or shoulder member 50 welded to one of the sides 31b of the tubular member abuts a vertical edge of one of the sides 34 of the channel member 35 to assist in locating and retaining the fire box in the horizontal position. When it is desired to tilt the fire box to the inclined or FIG. 5 position, the handle 40b of the latch rod is merely grasped by the user and pulled outwardly from the tilting coupling assembly against the action of the spring 41 to withdraw the end of the latch rod 40a from the hole 33, and the fire box is manually grasped and tilted to the FIG. 5 position. The fire box is retained in the tilted or dump position of FIG. 5 by a front stop member 51, which may be simply an elongated rod, for example of one half inch round steel stock, about two and three quarter inches long, welded to bottom and side wall portions of the tubing member 31 adjacent a lower corner thereof and inclined at the angle illustrated in FIG. 2, to abut the bottom 36 of the channel member 35 at the dumping position and stop the fire box at this position. It will be apparent that such dumping of the fire box facilitates removal of ashes from the fire box following use, and leaving the fire box in this dumping or tilted position during nonuse permits rain and wind to further remove ash residue from the fire box, so that the usual deterioration of the bottom of fire boxes which are maintained in horizontal position due to corrosive effect of the ash residue is avoided. Also, the grating member or grill top 20 may be readily tilted about the handle legs 26 which extend through the closed top rear slots 19 while the other handle legs 26 are swung upwardly through the opening at the upper end of the front slots 18 to assume the tilted position shown in FIG. 5, to facilitate cleaning of the fire box and insertion of larger pieces of fuel when desired.

What is claimed is:

1. An outdoor cooking grill for charcoal cooking and the like, comprising a generally rectangular fire box having a normally generally horizontal rectangular bottom wall and a pair of vertical parallel end walls and a vertical rear wall joined together to define an upwardly and forwardly opening fire chamber, the pair of end walls each having a front slot and a rear slot extending generally vertically along parallel axes from near the bottom of the associated end wall toward the top thereof, the front slot of each end wall extending through the top edge of the end wall in upwardly opening relation and the rear slot in each end wall terminating below the top of the end wall whereby the rear slot is closed at its top, a grating member having a generally rectangular grid portion of spaced parallel rods extending across the fire chamber above the bottom wall thereof and having at each end a generally U-shaped handle permanently extending therefrom, each provided with a front leg and a rear leg extending through the front slot and rear slot of the adjacent end wall respectively, the rear leg of each of the U-shaped handles being captured in the rear slot against removal therefrom while the front legs are tiltable upwardly through the open tops of the front slots for upward swinging movement of the grating members about a horizontal axis extending through the rear handle legs, the slots each having a plurality of vertically spaced notches for receiving the handle legs and supporting the grating member at a plurality of vertically spaced adjustment positions, a generally vertically extending pedestal for said firebox, and a coupling assembly between said firebox and the uppermost end portion of said pedestal including swivel coupling means supporting the firebox for rotary movement about a vertical swivel axis extending through the pedestal, and said coupling assembly further including tilt coupling means supporting the firebox for tilting movement about a horizontal axis adjacent to the bottom wall of the firebox to accommodate forward and downward tilting movement of the firebox to dispose its bottom wall in a forwardly declining position at an angle of about 45 degrees from the horizontal, and said tilt coupling means having stop members for supporting said firebox at said forwardly declining position and for locating the firebox at a normal position disposing its bottom wall substantially horizontally.

2. An outdoor cooking grill as defined in claim 1, wherein said swivel coupling means includes an inner pipe section extending along a vertical axis and joined at its upper end to said channel member and an outer pipe section telescopically supporting the inner pipe section therein for rotation about the vertical swivel axis through the pedestal, the pedestal including a downwardly facing shoulder surface above the lowermost end of the inner pipe section, and the inner pipe section having an aperture extending transversely therethrough below said downwardly facing shoulder surface for reception of a padlock shackle for locking the inner pipe section against withdrawal from the outer pipe section, and the pedestal including means defining an access opening and chamber for insertion and reception of the padlock in locking condition with the inner pipe section.

3. An outdoor cooking grill for charcoal cooking and the like, comprising a generally rectangular fire box having a normally generally horizontal rectangular bottom wall and a pair of vertical parallel end walls and a vertical rear wall joined together to define an upwardly and forwardly opening fire chamber, the pair of end walls each having a front slot and a rear slot extending generally vertically along parallel axes from near the bottom of the associated end wall toward the top thereof, the front slot of each end wall extending through the top edge of the end wall in upwardly opening relation and the rear slot in each end wall terminating below the top of the end wall whereby the rear slot is closed at its top, a grating member having a generally rectangular grid portion of spaced parallel rods extending across the fire chamber above the bottom wall thereof and having at each end a generally U-shaped handle permanently extending therefrom, each provided with a front leg and a rear leg extending through the front slot and rear slot of the adjacent end wall respectively, the rear leg of each of the U-shaped handles being captured in the rear slot against removal therefrom while the front legs are tiltable upwardly through the open tops of the front slots for upward swinging movement of the grating members about a horizontal axis extending through the rear handle legs, the slots each having a plurality of vertically spaced notches for receiving the handle legs and supporting the grating member at a plurality of vertically spaced adjustment positions, a generally vertically extending pedestal for said firebox, and a coupling assembly between said firebox and the uppermost end portion of said pedestal including swivel coupling means supporting the firebox for rotary movement about a vertical swivel axis extending through the pedestal, and said coupling assembly further including tilt coupling means supporting the firebox for tilting movement about a horizontal axis adjacent to the bottom wall of the firebox to accommodate forward and downward tilting movement of the firebox to dispose its bottom wall in a forwardly declining position at an angle of about 45 degrees from the horizontal, and said tilt coupling means having stop members for supporting said firebox at said forwardly declining position and for locating the firebox at a normal position disposing its bottom wall substantially horizontally, said tilt coupling means comprising an upwardly facing channel-shaped bracket having a bottom wall supported from said pedestal and a pair of upwardly extending channel sides and an upper tilt coupling member fixed to the bottom wall of the firebox and defining side elements inwardly paralleling and closely adjacent said channel sides, pivot means interconnecting said side elements and their adjacent channel sides along a horizontal pivot axis, and a spring biased manually releasible latch mechanism carried by one of said channel sides and projectible into latching relation with the adjacent side element for latching the firebox in its normal substantially horizontal position.

4. An outdoor cooking grill as defined in claim 3, wherein said latch mechanism comprises a latch housing fixed to the channel side carrying the latch mechanism and including means supporting a manually moving latch rod therein for reciprocative movement along a substantially horizontal axis, the side element nearest said latch mechanism having an aperture therein registering horizontally with said latch rod when the firebox is in its normal horizontal position and sized to receive an end portion of the latch rod in latching relation therein, and a coil spring within said latch housing surrounding portions of the latch rod within said housing and bearing against the housing and a shoulder on the latch rod for continuously urging the latch rod toward the adjacent side element into latching relation therein, and the latch rod having a laterally offset formation on its outer end providing a handle portion for manually retracting the latch rod from latching position.

5. An outdoor cooking grill as defined in claim 3, wherein said swivel coupling means includes an inner pipe section extending along a vertical axis and joined at its upper end to said channel member and an outer pipe section telescopically supporting the inner pipe section therein for rotation about the vertical swivel axis through the pedestal, the pedestal including a downwardly facing shoulder surface above the lowermost end of the inner pipe section, and the inner pipe section having an aperture extending transversely therethrough below said downwardly facing shoulder surface for reception of a padlock shackle for locking the inner pipe section against withdrawal from the outer pipe section, and the pedestal including means defining an access opening and chamber for insertion and reception of the padlock in locking condition with the inner pipe section.

6. An outdoor cooking grill as defined in claim 5, wherein said latch mechanism comprises a latch housing fixed to the channel side carrying the latch mechanism and including means supporting a manually movable latch rod therein for reciprocative movement along a substantially horizontal axis, the side element nearest said latch mechanism having an aperture therein registering horizontally with said latch rod when the firebox is in said normal horizontal position and sized to receive an end portion of the latch rod in latching relation therein, and a coil spring within said latch housing surrounding portions of the latch rod within said housing and bearing against the housing and a shoulder on the latch rod for continuously urging the latch rod toward the adjacent side element into latching relation therein, and the latch rod having a laterally offset formation on its outer end providing a handle portion for manually retracting the latch rod from latching position.

* * * * *